United States Patent [19]
Bucks et al.
[11] 3,792,445
[45] Feb. 12, 1974

[54] VEHICLE DATA RECORDING SYSTEM

[75] Inventors: Robert M. Bucks, Norristown; Frederick M. Ayars, Lansdale, both of Pa.

[73] Assignee: Mark & Son, Ltd., Palm Beach, Fla.

[22] Filed: Dec. 1, 1972

[21] Appl. No.: 311,140

[52] U.S. Cl. .......... 340/172.5, 346/33 D, 346/74 M
[51] Int. Cl. ........................ G11b 13/00, G01d 9/28
[58] Field of Search .......340/172.5; 179/100.2 MD, 179/100.2 Z; 346/33 M, 61, 60, 44, 33 D, 346/74 M; 235/30R, 45, 150.2; 73/346

[56] References Cited

UNITED STATES PATENTS

| | | | |
|---|---|---|---|
| 2,656,524 | 10/1953 | Gridley et al. | 340/206 |
| 3,099,817 | 7/1963 | Kendall | 340/172.5 |
| 3,188,647 | 6/1965 | Davis | 346/60 |
| 3,318,151 | 5/1967 | Behrendt et al. | 73/346 |
| 3,388,404 | 6/1968 | Bush | 346/24 |
| 3,394,381 | 7/1968 | Foster | 346/7 |
| 3,461,429 | 8/1969 | Gray | 340/172.5 |
| 3,512,706 | 5/1970 | Bruce-Sanders | 235/30 |
| 3,698,627 | 10/1972 | Kelch et al. | 235/30 |
| 3,703,985 | 11/1972 | Berg | 235/30 R |
| 3,716,679 | 2/1973 | Graesslin et al. | 179/100.25 |

*Primary Examiner*—Paul J. Henon
*Assistant Examiner*—James D. Thomas
*Attorney, Agent, or Firm*—Clarence A. O'Brien; Harvey B. Jacobson

[57] ABSTRACT

A vehicle data recording system comprising a plurality of vehicle condition sensors and a route location selector which furnish corresponding digital data which is processed and periodically fed to a magnetic tape cassette recorder, or the like, for recording on magnetic tape. The magnetic tape is advanced only periodically and the data is recorded without significant gaps between the words, such that several days of data may be recorded on a single tape cassette for subsequent storage or analysis.

8 Claims, 5 Drawing Figures

VEHICLE DATA RECORDING SYSTEM

The present invention is generally related to recording devices and, more particularly, to a highly versatile vehicle data recording system for the storage and subsequent analysis of vehicle data.

In the past, various recording devices have been provided for road vehicles, aircraft, and the like to provide permanent records of the vehicle's operation for subsequent analysis. Many such conventional devices have utilized paper chart or magnetic tape recorders which were continuously advanced during the vehicle's operation to provide a continuous record of the vehicle's operation. The paper chart recorders have proven impractical for many applications, as they are considerably bulky, are rather limited in the amount of data which they can record, and the paper charts may not be reused. Magnetic tapes, on the other hand, have proven more acceptable, as they are less bulky and may be erased for reuse. However, even the vehicle data recording systems which have utilized magnetic tapes have been limited to recordings of relatively short duration, usually less than a day. While such conventional systems were practical for trips of relatively short duration, for the most part, thcy were found to be impractical for longer trips, such as those normally made by transport trucks, and other commercial vehicles. Also, it was a considerable inconvenience for the vehicle operator to have to periodically unload and reload the recorder along the course of a trip. Furthermore, with such conventional arrangements there was considerable opportunity for error, as the tape reels could easily become mixed up or the recorder could be loaded improperly.

It has also been noted that most conventional vehicle data recording systems have been limited in the quantity and type of information which they were capable of handling. Due to the rising costs of trucking and other commercial transportation, it would be advantageous to be able to record data which will provide a close check upon several vehicle's condition to avoid costly repairs and maintenance. Most states across the country levy revenues on commercial vehicles which utilize their roadways. Such requires that trucking companies involved in interstate travel keep records of mileage travelled in each state for tax purposes at the end of the tax period. Thus, it would also be desirable that the vehicle data recording system include means of conveniently recording the states through which a commercial vehicle has travelled and retrieve such data at the end of each tax period, thereby eliminating the need for complex bookkeeping, or the like.

It is an object of the present invention to provide a novel vehicle data recording system for conveniently recording both vehicle operation data and data corresponding to the route location of vehicle travel.

Another object of the present invention is to provide a unique vehicle data recording system including means for recording data on a magnetic tape at predetermined time intervals, whereby a single tape may be used for several days without reloading the recorder.

It is a further object of the present invention to provide a versatile vehicle data recording system which records data in digital form on a tape cassette recorder with a transport mechanism which is automatically advanced on a periodic basis to record digital data words for subsequent analysis by computer, or the like, to provide a printout or other retrieval of the desired information.

Still another object of the present invention is to provide a novel vehicle data recording system which is compact, easy to install in existing vehicles, convenient to operate, and economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
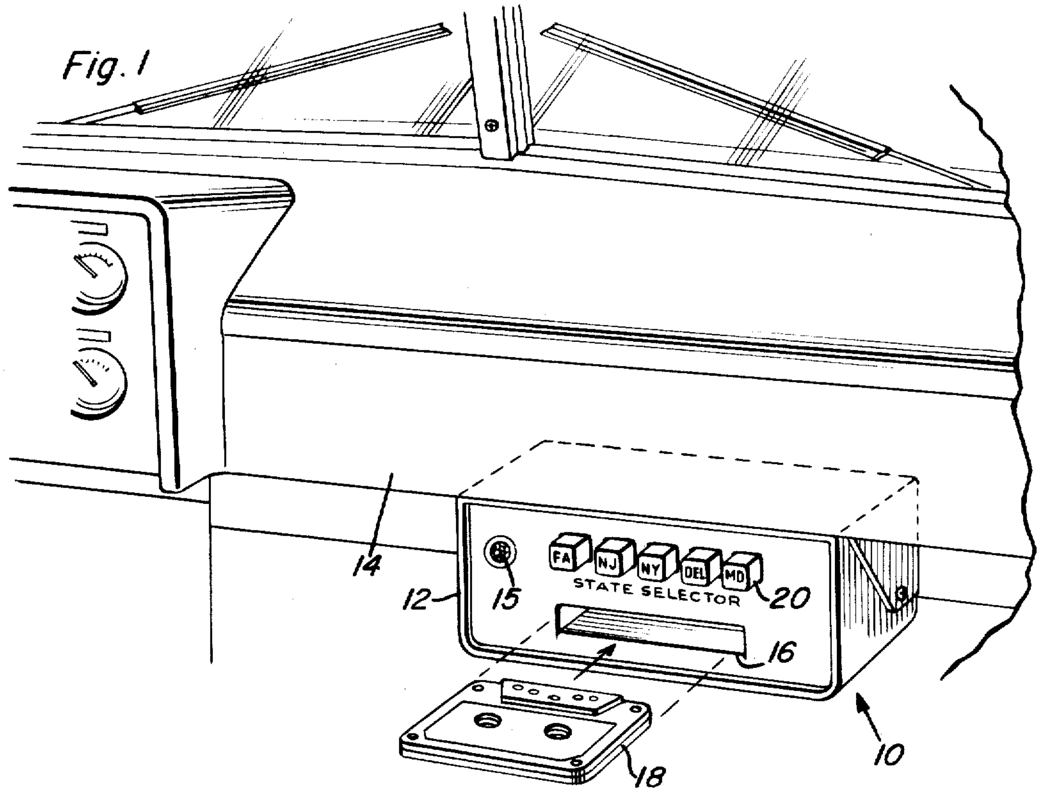
FIG. 1 is a perspective view of a preferred embodiment of the control and cassette recorder unit associated with the present invention and mounted to a typical vehicle dashboard.

Referring now, more particularly, to FIG. 1 of the drawings, a preferred embodiment of the control and recorder unit associated with the present invention is generally indicated by the numeral 10, and includes a housing 12 appropriately mounted to a typical vehicle dashboard 14 for convenient operation by the driver. It will be appreciated that the enclosure is of compact construction of approximately 5⅝ inch × 6⅝ inch × 8 1/16 inch, and may be easily installed in existing vehicles. Preferably, housing 12 is provided with an indicating light 15 and an opening 16 for receiving tape cassettes 18 in a conventional manner. The unit is further provided with a plurality of push button selectors 20, each appropriately labelled to correspond to a state through which the vehicle is travelling. Upon entering the state of Pennsylvania, for example, the vehicle driver depresses the button labelled "Pa., " such that the mileage travelled through each state is automatically recorded, as hereinafter explained. When the vehicle is in operation, the recording system of the present invention advances the magnetic tape periodically, or at predetermined time intervals, such that a standard tape cassette provides a recording time of 7.4 days. This eliminates the need for supervision over the tape recorder, such that the driver need not be concerned with unloading and reloading the magnetic tapes during a trip.

Figure 2:
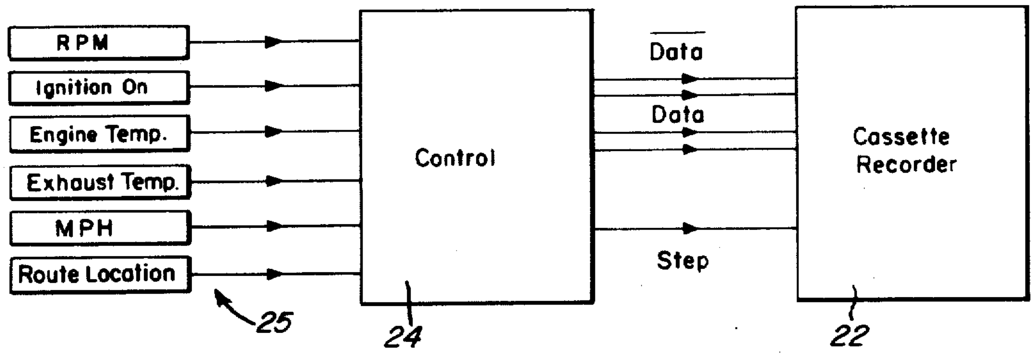
FIG. 2 is a block diagram of the circuitry associated with the present invention.

Referring now, more particularly, to FIG. 2 of the drawings, the tape cassette recorder associated with the present invention is indicated by block 22 and receives both digital data and step signals from a control 24. A plurality of input signals are fed to control 24 from vehicle condition snesors and the route location selector, generally indicated by the numeral 25 The input signals are appropriately processed by the control to provide the digital data to the cassette recorder. The control is provided with clock means which processes the input signals periodically, or at predetermined time intervals, and automatically advances the cassette recorder to record the digital data words. Preferably, the cassette recorder is of a commercially available item which is readily adaptable to recording digital data. One such recorder is sold under the trade name of "Memodyne."

Figure 3:
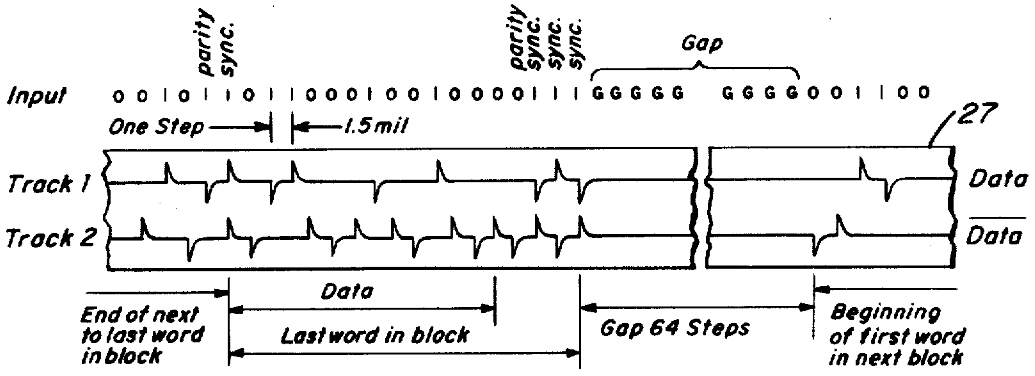
FIG. 3 is a diagrammatic illustration of the manner in which the data is recorded on the magnetic tape.

Referring to FIG. 3, the format for the digital data recorded on the magnetic tape is illustrated. The magnetic tape 27 passes over a dual track recording head, not illustrated, which in the form of digital pulse code signals representing the inputs from sensors 24 is connected to four "Data" and "$\overline{\text{Data}}$" lines such as shown in FIG. 2. As mentioned above, the data is fed to the cassette recorder only periodically, during which the recorder transport mechanism is simultaneously stepped to advance the magnetic tape a predetermined length past the recording head sufficient to record the collected data. The control provides a write-step pulse train which effects the feeding of the data and step signals to the recorder. The data is recorded on the positive rising edge of the write-step pulse train, with tape motion taking place on the positive and negative edges of the pulse train. Preferably, the motor associated with the tape transport mechanism advances the tape 615 steps per inch, at a stepping rate of 64 steps per second. The tape is stepped in a manner which provides insignificant gaps between each data word, thereby assuring maximum usage of the tape. Preferably, the data is recorded in fifteen bit groups. The first thirteen bits of each group being data, with the fourteenth bit being parity and the fifteenth bit, a synchronizing bit. Succeeding fifteen bit groups start immediately behind the synchronizing bit, and at some programmed count of data groups, a gap is written where no flux reversals are allowed. At the end of each block, three synchronizing pulses are written. This arrangement provides a most efficient means of recording the vehicle data.

Figure 4A:
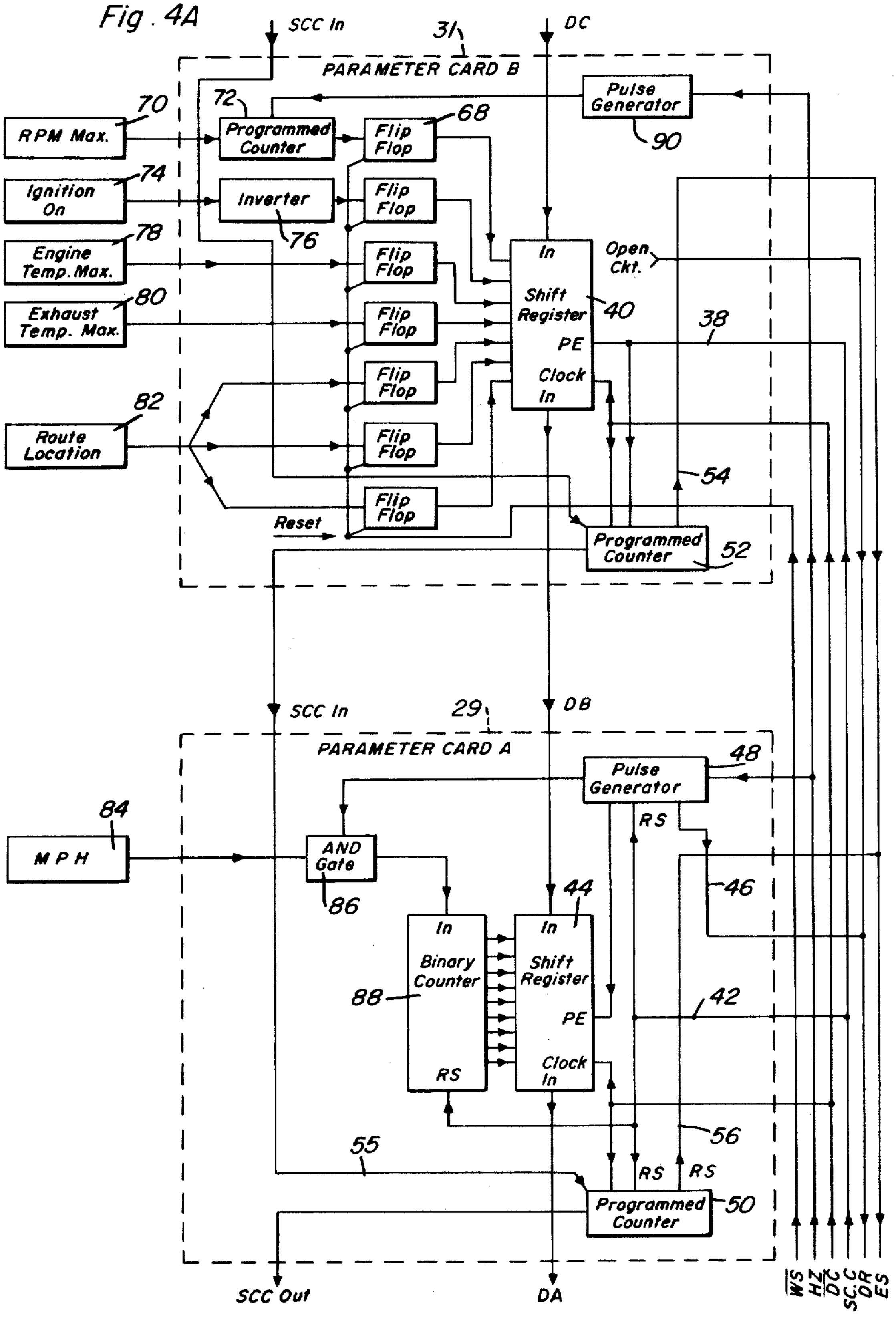
FIG. 4A is a flow diagram of a pair of parameter cards associated with the present invention.
Figure 4B:
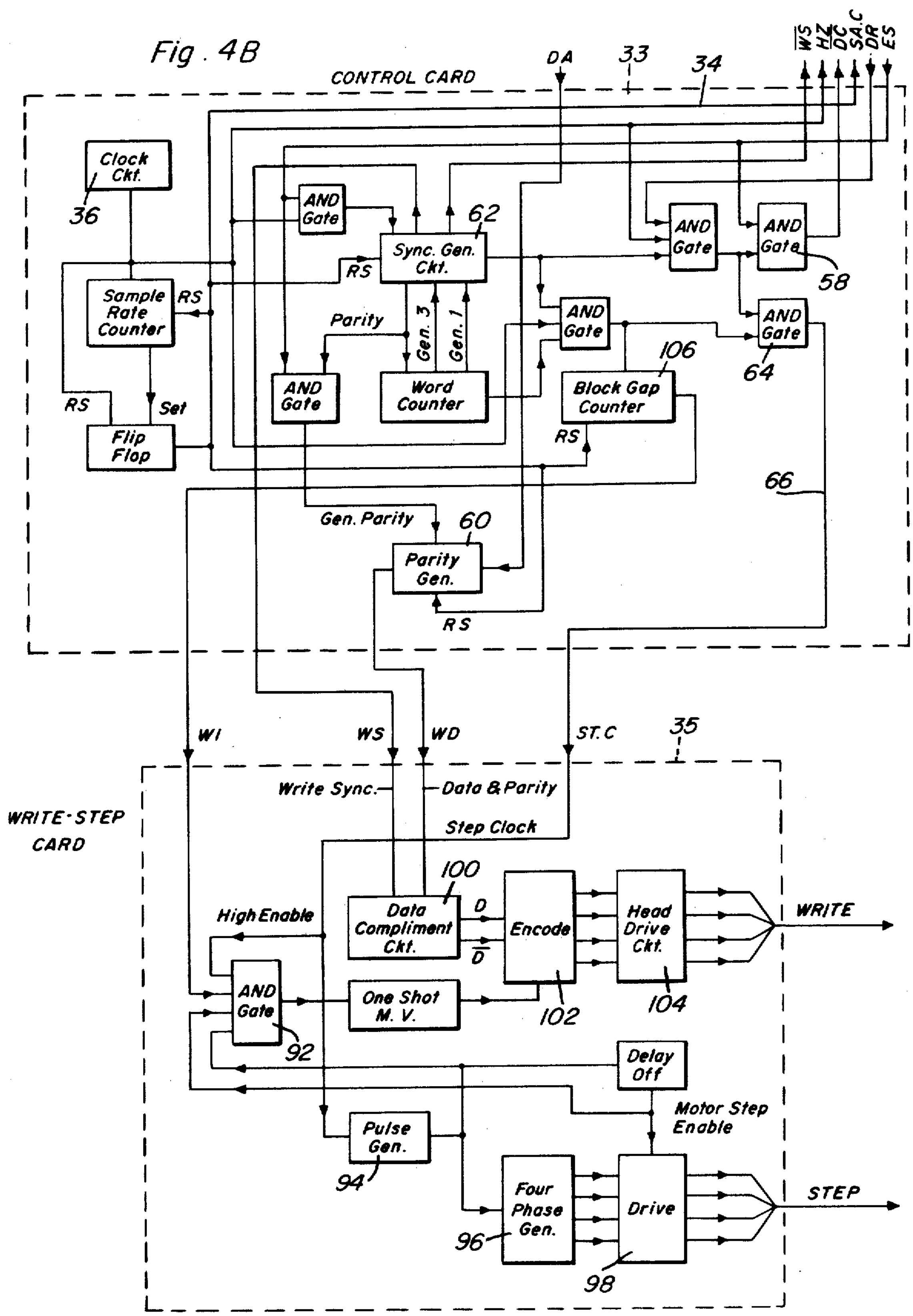
FIG. 4B is a flow diagram of the control and write-step cards associated with the present invention.

Referring to FIGS. 4A and 4B, it will be appreciated that the control associated with the present invention is comprised of a pair of Parameter cards 29 and 31, a Control Card 33, and a Write-Step card 35, each of said cards mounting commercially available logic circuit components as labeled and interconnected in accordance with the present invention as shown. Parameter Card A, illustrated in FIG. 4A, is provided with a "Miles Per Hour" input from an appropriate sensor, as hereinafter explained. Upon a command from the Control Card, Parameter Card A measures the miles per hour and the result is subsequently delivered to the Control Card via line DA. Parameter Card B is connected to a Parameter Card A and is provided with a plurality of inputs preferably corresponding to Maximum RPM, Ignition On, Engine Temperature Maximu, Exhaust Temperature Maximu, and Route Location. Upon command from the Control Card, Parameter Card B processes the input signals and delivers corresponding digital data to the Control Card through Parameter Card A, via lines DB and DA. The Control Card, illustrated in FIG. 4B, provides system control by generating various signals which are sent to the Parameter Cards and the Write-Step Card, as hereinafter explained. The Write-Step Card, upon command from the Control Card, causes the cassette recorder motor to step forward and causes data to be written on the magnetic tape.

Operation of the overall system may be briefly described as follows: A sample command pulse is generated by the Control Card and is delivered to the SA.C line 34. The sample command pulse is generated only at predetermined times, and determined by a clock circuit 36, and enters Parameter Card B as a parallel entry command signal for an output shift register 40. At the same time, the sample command pulse is fed to Parameter Card A through line 42. This causes the "Miles Per Hour" input data to be measured. After a predetermined time interval, preferably 1.8 seconds, the measured "Miles Per Hour"data is entered into a shift register 44 associated with Parameter Card A. This provides a "Data Ready" (DR) signal to be impressed upon lines 46 through pulse generator 48, whereby line 46 goes to a logic "1," indicating to the Control Card that data is ready to be shifted out.

When line 46 goes to a logic "1" on both parameter cards A and B, the sync generator 62 in the Control Card generates a train of control pulses passed by AND gates to the $\overline{\text{DC}}$ line. This causes Parameter Cards A and B to shift data from registers 44 and 40 to the Control Card. Data from shift register 40 passes through shift register 44 to the Control Card. As this data is being shifted out, the $\overline{\text{DC}}$ pulses are counted by counters 50 and 52 in Parameter Cards A and B, respectively. Parameter Card B counts the number of $\overline{\text{DC}}$ pulses required to shift its data out then enables counter 50 to count by forcing line 54 positive to a logic "1." Also, at this time, the ES line is enabled to go high, but doe not since it is AND connected with card A. When counter 50, associated with Parameter Card A, completes its count of $\overline{\text{DC}}$ pulses, the ES line goes high. This stops the $\overline{\text{DC}}$ pulse train by way of AND gate 58 of the Control Card.

As the data is being shifted out of the parameter cards and fed to the Control Card, parity and synchronizing bits are added by parity generator 60 and sync generator circuit 62. Also, as the data is being shifted out, a train of pulses is sent from the Control Card to the Write-Step Card by way of the ST.C line connected to AND gate 64 via line 66. This pulse train causes the Write-Step Card to advance the cassette recorder motor one step for both the leadng and trailing edge of the ST.C pulse train and causes the data to be written on each positive going edge of the ST.C pulse train.

Referring again to FIG. 4A, the operation of Parameter Card B will be explained in more detail. The vehicle condition sensors and route selector provide several input signals to Parameter Card B. An RPM sensor 70 provides a pulse train to a programmed counter 72. Preferably, sensor 70 is comprised of a rotor driven by a tachometer cable to interrupt a light source to a phototransistor, resulting in a pulse train. Counter 72 is programmed to a predetermined value, and if the count reaches the value, the associated flip-flop 68 is set at a logic "1" for entry into shift register 40 when the SA.C line goes momentarily high. The RPM measurement is repetitive, with the circuit being periodically reset to start a new count.

An "Ignition On" input is provided by an appropriate means 74, preferably associated with the ignition switch, which provides a +12 volt signal which is fed to an inverter 76 to cause one of the flip-flops to be set and a logic "1" entered into shift register 40 when the SA.C line goes momentarily high.

Engine and Exhaust Temperature detectors 78 and 80, preferably a thermal responsive switch, provide input signals when the temperatures exceed predetermined limits. This sets the associated flip-flops to go to a logic "0" for entry into the shift register.

A Route Location selector circuit 82, associated with push button selectors 20, provides appropriate inputs to three of the flip-flops of Parameter Card B to provide digital data to shift register 40 to identify the location of the route being travelled.

When a sample command pulse (SA.C) is received by Parameter Card B, the data has already been defined by the flip-flops. The data stored in shift register 40 is shifted out only when the data stored in shift register 44 is ready to be shifted out, as indicated when the DR line goes high. Data clock pulses are then received via the $\overline{DC}$ line and counted by program counter 52, which enables line 55 to go high when the programmed count is reached to enable counter 50 to start counting.

A Miles Per Hour sensor 84, similar to the RPM sensor, but coupled to the speedometer cable, is connected to Parameter Card A and provides a pulse train to AND gate 86 which is enabled through pulse generator 48. The output of AND gate 86 is connected to a binary counter 88, such that when AND gate 86 is opened, the pulse train from sensor 84 is counted. At the end of a predetermined time interval, preferably 1.8 seconds, gate 86 is closed and the count is transferred to shift register 44. At the same time, line 42 goes high, causing the DR line to go high and indicating to the Control Card that data is ready to be shifted out.

It will be appreciated that during the processing of data into the shift registers, the Control Card provides a timing pulse train, preferably 128 Hz. by way of the HZ line to both Parameter Cards A and B for timing purposes. The HZ line is connected to pulse generator 48 of Parameter Card A and pulse generator 90 of Parameter Card B for measuring the Miles Per Hour and RPM functions, respectively. In addition, the control cards provide a reset signal to Parameter Card B by way of the $\overline{WS}$ line, which is effective to reset flip-flops 68 after the data has been shifted out of the registers.

The write-step pulse train is received by the Write-Step Card by way of the ST.C line and is fed to AND gate 92 and a pulse generator 94. The output from pulse generator 94 is fed to a four phase generator 96, which in turn effects operation of a motor drive circuit 98. This causes motion of the magnetic tape whenever the write-step pulse train enters the Write-Step Card. Preferably, this advances the tape 615 steps per inch, with a stepping rate of 64 steps per second.

The data and parity bits are received by a data compliment circuit 100 by way of line WD. A write sync signal is received from sync generator circuit 62 of the Control Card and causes the Write-Step Card to generate a write sync pulse when the WS line goes to a logic "1." The outputs from data compliment circuit 100 are fed to a NRZI encode circuit 102, the output of which is fed to a record head drive circuit 104. This arrangement is such that a flux reversal on the "Data" head indicates a logic "1" and a flux reversal on the "$\overline{\text{Data}}$" head indicates a logic "0." A flux reversal on both lines at the same time indicates a sync pulse.

Data groups are counted by a block gap counter 106 of the Control Card and when a program number is reached a data gap, also programmable, is written. This causes the $\overline{WI}$ line to go to a logic "0," causing the Write-Step Card to inhibit data from being written while the cassette motor is running.

It will be appreciated that the vehicle data recording system of the present invention may be provided with additional parameter cards for providing additional data, as desired. With the illustrated inputs, the following statistical data is retrievable:

1. Total elapsed time

2. Total time in motion
3. Average speed
4. Average speed in motion
5. Peak speed
6. Time exceeding arbitrary speed limit set by dispatcher
7. Total time stopped
8. Time of engine on with vehicle stopped
9. Number of stops exceeding arbitrary time period set by dispatcher
10. Duration of each stop exceeding arbitrary time period set by dispatcher
11. Time of high engine temperature
12. Time of high exhaust temperature
13. Time of excessive RPM
14. Mileage
15. Distance travelled in each state From the foregoing description, it will be appreciated that the vehicle data recording system of the present invention provides a versatile means of recording vehicle related data for subsequent storage and analysis. By utilizing standard tape cassettes with three hundred foot tapes, and periodically stepping the recorder every 10 seconds, a total recording time of 7.4 days may be provided. Of course, this is dependent upon the amount of data recorded and the time interval between each writing operation. A greater number of data inputs may be provided, with a corresponding decrease in the total recording time of each tape cassette. The truly incremental recording arrangement with insignificant gaps between each word eliminates tape wastage common with many conventional recording systems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle data recording system comprising magnetic tape recording means for recording selected data representative of a vehicle's operation, said tape recording means including magnetic head means and tape transport means for incrementally advancing a magnetic tape past said head means during spaced intervals of time, means for providing a plurality of input signals corresponding to the vehicle's operation, and control means for periodically processing and sampling said input signals to simultaneously provide a plurality of data signals to said head means for recording on the magnetic tape and provide step signals to said tape transport means, said tape transport means advancing the tape by predetermined increments in response to said periodic step signals.

2. The assembly set forth in claim 1 wherein said means for providing said input signals includes means for sensing a plurality of vehicle conditions.

3. The assembly set forth in claim 2 together with switch means including a plurality of selectively operable switches for providing input signals representative of a route of vehicle travel.

4. The assembly set forth in claim 3 wherein each of said switches corresponds to a route through a tax zone.

5. The assembly set forth in claim 4 wherein said switch means and tape recording means are mounted in a compact housing located in the vehicle for convenient operation by a driver.

6. A vehicle data recording system comprising means for sensing a plurality of vehicle conditions or the like to provide a plurality of corresponding input signals, means for encoding said input signals into corresponding digital bits, means for storing said digital bits in the form of digital data words, control means including means for producing clock pulse trains which are operative to pass said digital data words from said storage means, said control means including means for periodically initiating said pulse trains and means responsive to the passage of the stored digital data words from said storage means for terminating said pulse trains, tape recording means including head means for recording data on a magnetic tape and transport means for selectively advancing the magnetic tape past said head means, means receiving and processing said digital data words from said storage means and feeding such to said head means and simultaneously producing motor drive signals, sid transport means advancing the magnetic tape in response to said motor drive signals, said means for receiving said digital data words including means for terminating said motor drive signals in response to the completion of the passage of the digital data words from said storage means, and means for periodically producing sample command pulses to enable said storage means to store said words.

7. The assembly set forth in claim 6 wherein said storage means including a plurality of registers each receiving digital data bits corresponding to said vehicle conditions, said assembly further including means for producing data ready signals when a digital data word is stored in each of said plurality of registers to enable said control means to produce said data clock pulse trains.

8. The assembly set forth in claim 1 wherein said means for receiving said digital data words includes means for terminating said motor drive signals in response to the completion of a digital data word.

* * * * *